United States Patent [19]
Le

[11] Patent Number: 4,789,287
[45] Date of Patent: Dec. 6, 1988

[54] THROUGH BOLT CONNECTION FOR UNILATERALLY ACCESSIBLE LOCATIONS

[75] Inventor: Thanh-Son Le, Berlin, Fed. Rep. of Germany

[73] Assignee: Nixdorf Computer AG, Paderborn, Fed. Rep. of Germany

[21] Appl. No.: 887,148

[22] Filed: Jul. 17, 1986

[30] Foreign Application Priority Data

Jul. 18, 1985 [DE] Fed. Rep. of Germany ....... 3525955

[51] Int. Cl.$^4$ ..................... F16B 39/00; F16B 21/00
[52] U.S. Cl. ................... 411/107; 411/349; 411/551
[58] Field of Search ............. 411/21, 551, 177, 180, 411/72, 73, 337, 103, 107, 349, 351, 354; 405/259

[56] References Cited

U.S. PATENT DOCUMENTS

| | | | |
|---|---|---|---|
| 2,120,577 | 6/1938 | Schulte | 411/73 |
| 2,403,247 | 7/1946 | Sullivan | 411/551 |
| 2,877,818 | 3/1959 | Johnson | 411/107 |
| 3,956,803 | 5/1976 | Leitner | 411/349 |
| 4,372,015 | 2/1983 | Rhoton | 24/221 |
| 4,557,631 | 12/1985 | Donan, Jr. et al. | 411/21 |

FOREIGN PATENT DOCUMENTS

386162 9/1973 U.S.S.R. ...................... 411/351

Primary Examiner—Neill Wilson
Attorney, Agent, or Firm—Cullen, Sloman, Cantor, Grauer, Scott & Rutherford

[57] ABSTRACT

Through bolt connection for unilaterally accessible locations. The through bolt has a cylindrical head disposed eccentrically to the centerline of the bolt by a measure e, and a sleeve disposed likewise eccentrically to the sleeve centerline by a distance e. The bolt is received in the sleeve and together they are thrust into the through hole in the parts to be fastened. Head and sleeve are of the same diameter, so that they can be inserted together head-first in the through hole in one single position relative to each other. After the bolt head is located outside the through holes, the bolt is rotated through an angle of 180° to the other side so that now, owing to the eccentricity, the head catches over the edge of the through hole and its bearing surface is in contact with the surface on the inaccessible side. In this position, a nut with washer may be screwed on and tightened with the sleeve performing the function of a locating pin.

14 Claims, 2 Drawing Sheets

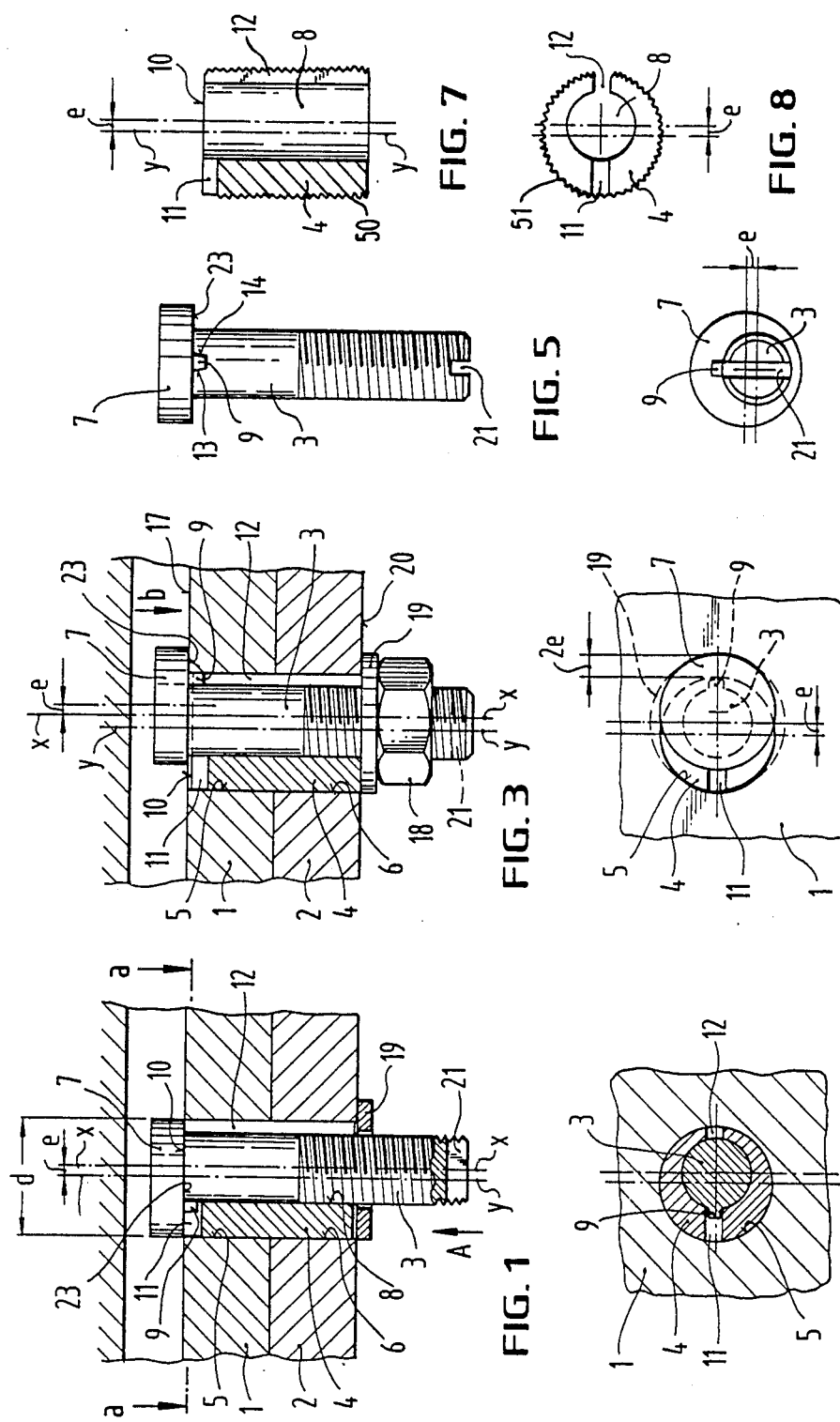

THROUGH BOLT CONNECTION FOR UNILATERALLY ACCESSIBLE LOCATIONS

BACKGROUND

The invention relates to a through bolt connection, in particular for unilaterally accessible locations, where the connecting means are to be applied from one accessible side only.

It is known that in conventional through bolt connections, the fastened parts may be connected together by means of a through bolt and a nut if both sides of the location are unobstructed. The through bolt may be inserted through the through holes in the fastened parts from one side and the nut drawn up from the other side. In a unilaterally accessible location, however, such through bolt connections cannot be made with conventional bolts and nuts.

If through bolt connections are desired, or indeed required, machine parts, for example, must be oversize in order to accommodate the connections. Consequently, many assemblies are unnecessarily large and heavy.

BRIEF SUMMARY OF THE INVENTION

The object of the invention is to provide a through bolt which may be inserted from one accessible side of the parts to be connected into the through holes in the parts in such a manner that the head of the bolt will catch the edge of the hole on the inaccessible side with the bearing surface of the head being in contact with the fastened part. A nut may then be threaded onto the bolt and drawn up, a through bolt connection thereby produced. The through bolt connection may readily be undone with all the connecting means being reusable.

The object is accomplished, according to the invention, in that the through bolt has a cylindrical head disposed eccentrically to the centerline of its shank by a measure e, the head diameter being of such size that it can be readily inserted through the through holes in the parts to be fastened.

The through bolt so constructed is first inserted in a through hole in a sleeve member, this through hole being likewise disposed eccentrically to the axis of the sleeve by a measure e. The sleeve has substantially the same diameter as the cylindrical head. In this assembled condition, there is only one single position in which the cylindrical head coincides with the sleeve in such a way that the two can be inserted together into the through holes in the parts to be fastened. This position is maintained by a lug provided on the bearing surface of the head, lodged positively in the direction of rotation in a groove extending through the installation end of the sleeve. After the through bolt has been inserted head-first together with the sleeve into the through hole in the parts to be fastened so that the head is located outside the through holes, the interlock between the lug and the groove is released by pushing the through bolt further into the hole so that the lug is removed from the groove and the bolt becomes rotatable.

The through bolt is then rotated through an angle of 180° to the opposite side of the sleeve so that the lug, when the through bolt has been drawn back, will positively engage a lengthwise slit extending along the sleeve parallel to the bolt centerline. In this condition, the through bolt is positively connected with the sleeve by way of the lug, preventing rotation. Owing to the 180° rotation and the eccentricity, the head will grip the edge of the through hole on the inaccessible side with its bearing surface resting on the surface of the part fastened. Hence, the areas of contact between the head and fastened part are not of the usual annular shape, but sickle-shaped, with a widest point measuring 2e from the centerline.

The through bolt connection can be completed by threading on and drawing up a fastening means such as a standard nut.

Owing to the interlock between the through bolt and sleeve, the bearing of the head on the fastened part over a maximum sickle-shaped area of contact is ensured at all times, even if the sleeve should rotate on its own centerline.

The through bolt connection is released in the reverse sequence of operations.

The periphery of the head may be provided with cutting teeth so that after a 180° rotation, the head will dig its own way into the blind hole in a part made of soft material such as wood, plastic, cement, etc. This is especially advantageous if one of the parts to be fastened is too thick, for example a wall.

On the periphery of the sleeve inside the blind hole, milling, serration, threading or the like may be provided, so that the friction bond between the sleeve and the fastened part will be promoted thereby. The sleeve may alternatively be provided with a collar, taking the place of a loose washer. Since the nut does not have to be removed to release the through bolt, the nut may be permanently attached to the bolt. In that case, the through bolt, sleeve, washer if desired, and nut form a unit.

Between the sleeve and the through bolt and/or the fastened part, a threaded connection may alternatively be arranged.

The advantages achieved by the invention consist in that a releasable, secure through bolt connection is obtained in a unilaterally accessible location, without need for oversized parts merely to accommodate the bolt connection. The fastened parts, in particular rotating parts, are interconnected positively in the direction of torsion, without play by way of the sleeve, and hence the bolts are not acted upon directly by dynamic forces perpendicular to the bolt centerline, the bolt-sleeve unit assumes the function of a bolt and of a pin, the pin requires no axial securing means, and it can be simply removed from the holes.

Embodiments of the invention are represented in the drawings by way of example and will be described below in more detail.

BRIEF DESCRIPTION OF DRAWINGS

1st Embodiment

FIG. 1 shows a longitudinal section of a through bolt connection in assembled condition.

FIG. 2 shows a section at a—a in FIG. 1.

FIG. 3 shows a longitudinal section of a through bolt connection in tightened condition.

FIG. 4 shows a view in the direction b in FIG. 1.

FIG. 5 shows a front view of a through bolt.

FIG. 6 shows a view in the direction c in FIG. 5.

FIG. 7 shows a longitudinal section of a sleeve.

FIG. 8 shows a top view corresponding to FIG. 7.

DETAILED DESCRIPTION OF THE INVENTION

Figure 9:
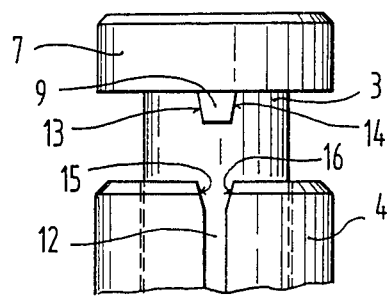
FIG. 9 shows the location of the lug in the longitudinal slit in the sleeve.

In the first embodiment as per FIG. 1, the two parts 1 and 2 to be fastened are connected by a through bolt connection, where the connecting means are applied from the accessible side A of the location only (FIG. 1).

FIG. 1 shows a longitudinal section of a through bolt connection in assembled condition, the through bolt 3 being inserted head-first together with the sleeve 4 into the through holes 5 and 6 so that the cylindrical head 7, disposed eccentrically to the shank centerline by a measure e, is located just outside the through hole 5 (FIG. 1).

The through bolt 3 occupies a through hole 8 in the sleeve 4, which hole is likewise disposed eccentrically to the sleeve centerline y—y by a measure e. The diameter d of the cylindrical head 7 is chosen of just such size that it can be thrust through the through holes 5 and 6. The sleeve has the same diameter d as the head 7, so that in the inserted condition there is only one single position in which the cylindrical head 7 coincides with the sleeve 4 in such a way that the through bolt 3 can be inserted head-first together with the sleeve 4 through the through holes 5 and 6. This position is maintained at all times by an interlock between a lug 9 (FIG. 2, 5, 6) provided at the bearing surface 23 of the head 7 and a groove 11 (FIG. 2, 4) extending through the face of the sleeve 4 on the installation side. At the narrowest side of the sleeve 4—that is, opposite the groove 11—a slit 12 (FIG. 7) extends lengthwise to the sleeve centerline, so that the sleeve 4 is therefore open on one side (FIG. 8).

Once the cylindrical head 7 is located outside the through hole 5, the through bolt 3 is pushed in by itself, breaking the lock between lug 9 and groove 11 so that the through bolt 3 can now be rotated relative to the sleeve 4. The through bolt is then rotated through an angle of 180° relative to the sleeve 4, so that after the through bolt 3 has been drawn back, the two inclined flanks 13 and 14 of the lug 9 are lodged in positive contact between the two inclined surfaces 15 and 16 of the slit 12 (FIG. 9). Owing to the 180° rotation and the eccentricity, the cylindrical head 7 grips the edge of he through hole 5 and the bearing surface 23 rests on the surface 17 of the fastened part 1. The area of contact between head 7 and fastened part 1 is now sickle-shaped, with a widest point measuring 2e (FIG. 4) from the centerline. This area of contact is maintained at all times by the geometrical interlock between lug 9 and slit 12, even if the sleeve 4 rotates on its own centerline.

In this condition, a nut 18 can be screwed on and drawn up, a washer 19 having first been interposed.

The length of the sleeve is chosen such that the sleeve 4 is always shorter than the distance between the two surfaces 17 and 20, so that a snug contact of the parts fastened is assured.

The inclined flanks 13 and 14 are chosen such that the lug 9 by way of its two inclined surfaces 15 and 16 tends to force the slit 12 apart, creating a self-locking effect. The sleeve 4 is thus spread, accommodated under tension and without play in the through holes 5 and 6, so that the two parts 1 and 2 fastened, particularly when a torque is to be transmitted from one to the other, remain positively interlocked without play in the direction of torsion. The sleeve 4 now performs the function of a locating pin, which however requires no axial securing means and can be simply disassembled.

The advantages of the through bolt connection so constructed are obvious. In the case of fastened parts subject to dynamic load, the through bolts are not directly acted upon by alternating stresses, in particular directed perpendicular to the bolt centerline, so that canting between bolt and nut, one of the causes of spontaneous loosening of bolt connections, is prevented. The shearing stress on through bolts is likewise substantially diminished by the sleeves.

On the end of the bolt, a groove 21 passes through perpendicular to the bolt centerline, not only indicating the direction in which the cylindrical head 7 is set but also serving as a location on the through bolt for a screwdriver to rotate the bolt with respect to the sleeve.

Upon release of the bolt connection, the nut 18 may be either removed completely or unscrewed just enough to break the interlock between lug 9 and slit 12 by a blow in the direction of the bolt centerline, so that the head 7 can be turned back to its initial position. Then the through bolt 3, complete with sleeve 4, washer 19 and nut 18 can be pulled all at once.

Since the nut 18 need not be unscrewed all the way, the groove 21 at the end of the bolt may be opened up so as to deform the threaded portion sufficiently to prevent removal of the nut 18. In this way, the nut 18 is secured against loss, and the through bolt 3 with nut 4, washer 19 and nut 18 form a unit that can be installed and/or pulled bodily.

Figure 12:
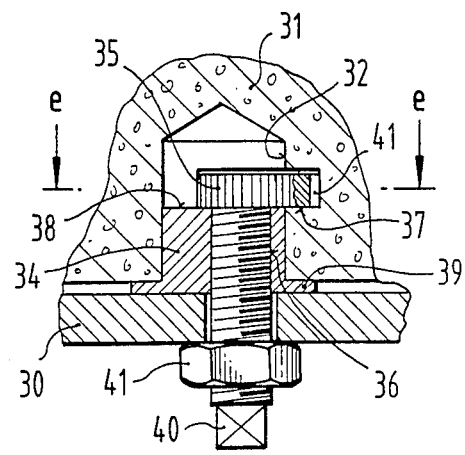
FIG. 12 shows a longitudinal section of a through bolt connection with a blind hole, in tightened condition.

In the second embodiment as in FIGS. 10–13, a fastened part 30 is bolted to a wall 31 of masonry by means of a through bolt connection (FIG. 12).

Since the wall 31 is too thick, it is not expedient to make a through hole; instead, a blind hole 32 is drilled in the wall 31.

Figure 10:
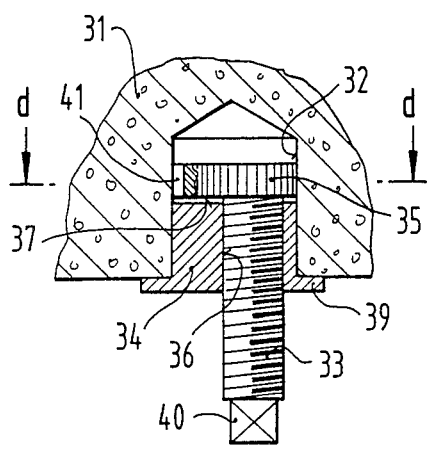
FIG. 10 shows a longitudinal section of a through bolt connection with a blind hole, in assembled condition.
Figure 11:
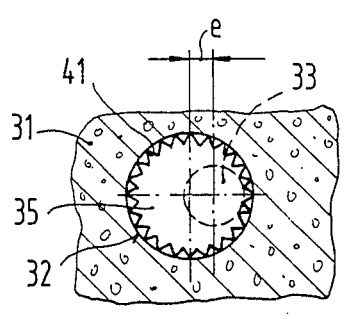
FIG. 11 shows a section at d—d in FIG. 10.

FIG. 10 shows a through bolt 33 together with a sleeve 34 in assembled condition in the blind hole. The through bolt 33 has a cylindrical head 35 disposed eccentrically to the bolt centerline by a measure e and provided on its periphery with hardened cutting teeth 41 (FIG. 11, 13). The sleeve 34 has a threaded hole 36 matching the through bolt 33 and is likewise eccentric to the sleeve centerline by a measure e. The through bolt 33 is screwed into hole 36. The location of the head 35 relative to the sleeve is such that the through bolt can be inserted head-first together with the sleeve 34 into the blind hole 32 (FIG. 10, 11).

On the periphery of the sleeve inside the blind hole 32, teeth or serrations are provided so that the sleeve may be driven in hand tight by concussion into the blind hole 32 until the collar 39 comes to bear (FIG. 10).

Figure 13:
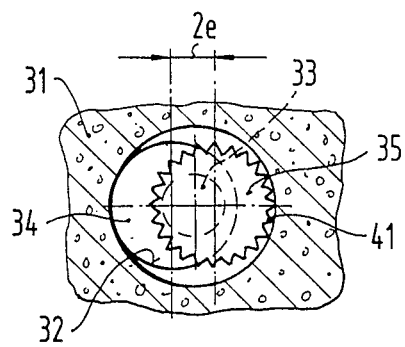
FIG. 13 shows a section at e—e in FIG. 12.

Now the through bolt 33 is screwed in head-first by a square stub 40 provided at the threaded end, so that the cutting teeth 41 will dig out the space in the blind hole for the cylindrical head 35 after the 180° rotation (FIG. 13). Then the bearing surface of the head 35 will be in contact with the face 38 of the sleeve 34 (FIG. 12).

Now the part 30 to be fastened can be put in place. Then the nut 41 can be screwed on and drawn tight, the through bolt 33 being held by its square lug 40 FIG. 10, 12.

In this way, a through bolt connection is made in a blind hole. Owing to the eccentric head 35, the sleeve 34 is not only frictionally but also mechanically locked in connection with the wall 31 in the direction of the bolt centerline, so that the bolt connection is more secure than when friction anchors are employed.

From the aforegoing description it becomes clear that the screw head 7 and, respectively, 35 in each case has a function of a holding element which is arranged asymmetrically relative to the screw bolt center axis. The said holding element need not be rendered in the shape of a disk or a head under all circumstances. Rather, it may also be, e.g., bar-shaped so that as a whole, there results a hook-shaped screw bolt, similar to the cross sections represented in FIGS. 1, 3, 10 and 12.

What is claimed is:

1. A connecting device for use in joining parts having aligned passage bores of a predetermined diameter, comprising:
    a screw bolt member having a head portion provided at one end of a shank portion of lesser diameter, the other end of said shank portion member being threaded, the center axis of said head portion being transversely disposed relative to the center axis of said shank portion by an eccentricity distance, the maximum cross sectional dimension of said head portion being less than the inner diameter of said passage bores;
    a passage sleeve member having an outer diameter not greater than said head portion diameter and having an eccentric bore therethrough for receipt of said shank portion, said eccentric bore having its center axis transversely disposed relative to the center axis of said passage sleeve member by a distance substantially equal to said eccentricity distance, said passage sleeve member further including a transverse groove provided at one end adjacent said eccentric bore, and said screw bolt member further includes a catch adapted to fit into said groove when said head portion and said passage sleeve member are concentrically aligned; and,
    a threaded locking member removably installed on said threaded end of said shank portion, said threaded locking member being tightenable on said shank portion to draw said parts and said head portion into tight locking relationship to each other.

2. The device of claim 1 wherein said passage sleeve member further includes a longitudinal slot adjacent said eccentric bore where said eccentric bore is nearest the outer periphery of said passage sleeve member.

3. The device of claim 1 wherein said passage sleeve member further includes a longitudinal slot adjacent said eccentric bore and arranged diametrically with said transverse groove.

4. The device of claim 1 wherein said catch is shaped convergently in the direction towards the outer periphery of said passage sleeve member.

5. The device of claim 4 wherein said catch has side flanks which are inclined relative to a diametrical plane of said screw bolt member.

6. The device of claim 5 wherein the end of said longitudinal slot facing said catch is divergent in the direction towards said catch.

7. The device of claim 1 wherein said shank portion further includes a transverse slot at the end of said shank portion opposite said head portion.

8. The device of claim 1 wherein said eccentric bore is threaded.

9. The device of claim 8 wherein said passage sleeve member further includes a collar at its end opposite from said head portion.

10. The device of claim 1 wherein said head portion includes cutting teeth along its outer periphery.

11. The device of claim 1 wherein said passage sleeve member further includes cutting teeth along its outer periphery.

12. The device of claim 1 wherein the outer periphery of said passage sleeve is threaded.

13. The device of claim 1 wherein said shank portion includes a square lug at its end opposite from said head portion.

14. The device of claim 1 wherein said head portion is disc-shaped and has a peripheral profile corresponding to the inner profile of said passage bores.

* * * * *